J. H. STORM.
ATTACHMENT FOR CLEANING PLOWS.
No. 180,166. Patented July 25, 1876.
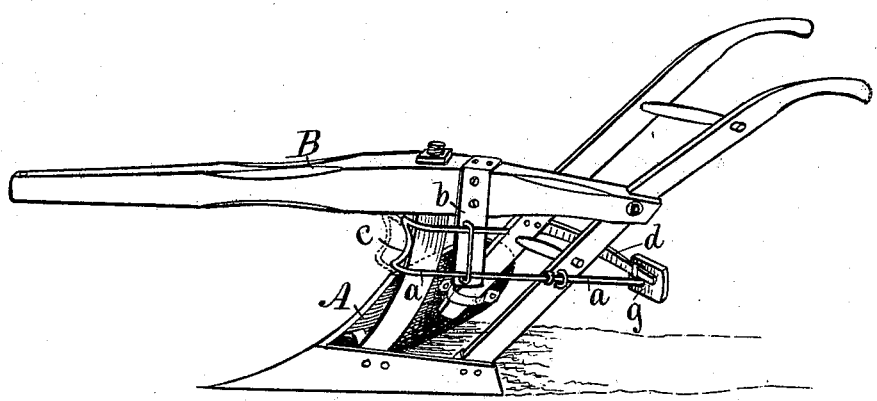
Witnesses:
Inventor:
James H. Storm,
By Thomas G. Orwig, Atty.

UNITED STATES PATENT OFFICE.

JAMES H. STORM, OF MITCHELLVILLE, IOWA.

IMPROVEMENT IN ATTACHMENTS FOR CLEANING PLOWS.

Specification forming part of Letters Patent No. 180,166, dated July 25, 1876; application filed May 8, 1876.

*To all whom it may concern:*

Be it known that I, JAMES H. STORM, of Mitchellville, in the county of Polk and State of Iowa, have invented a Plow-Cleaning Device and Attachment for Plows, of which the following is a specification:

The object of my invention is to provide a simple and practical means for preventing weeds and rubbish from gathering on and adhering to the mold-board of a plow, and for catching such obstructions and refuse matter, and placing it in position to be turned under the furrow-slice and buried. It consists in constructing and combining a reciprocating shaft, a weed-catching device, a treadle-block, and a spring, and attaching and operating the same on a plow, as hereinafter fully set forth.

My drawing is a perspective view, illustrating the construction, application, and operation of my invention.

A represents the mold-board of a plow. B is the plow-beam.

$a\ a$ is my suspended shaft, having a weed-catching device, $c$, at its front end, and a treadle, $g$, at its rear end. $b$ is the shaft-bearer, rigidly secured to the plow-beam B in any suitable way. It has eyes or bearings in its lower ends, through which the shaft $a$ passes and moves. $d$ is a spring, combined with the shaft $a$ in such a manner that it will allow the shaft to slide forward when pressed, and instantly draw it back again to its normal position when the pressure is removed.

In the practical operation of my invention the weed-catcher $c$, standing vertically along the front edge of the mold-board, will gather the weeds and obstructions and keep them off the mold-board. By pressing the treadle $g$ with the foot, and thereby imparting a forward and horizontal motion to the sliding shaft $a$, carrying the weed-catcher $c$, while the plow is advancing, the loosened and turning soil and furrow-slice will catch the weeds thrown forward from the weed-catcher, and turn them under and bury them. The plowman and operator can thus readily, without leaving his position at the plow-handles, keep the plow clean and prevent its becoming clogged and thrown out of the ground by occasionally, as required, kicking against or treading upon the treadle $g;$ thus, in conjunction with the spring $d$, imparting a reciprocating motion to the suspended horizontal shaft $a$, carrying the weed-catcher $c$.

I am aware that shafts carrying cleaning devices have been attached to a plow and operated by hand-levers and springs; but I claim that my manner of constructing a plow-cleaning attachment adapted to be operated by the plowman's foot is novel and greatly advantageous.

I claim as my invention—

The reciprocating shaft $a$, doubled at its front end, to form a weed-catching device, $c$, and carrying the treadle-block $g$ at its rear end, in combination with the bearer $b$, carried by the plow-beam, and the spring $d$, carried by the plow-handle, substantially as and for the purposes shown and described.

JAMES H. STORM.

Witnesses:
HIRAM REYNOLDS,
JAMES EMBREE.